Figure 1:
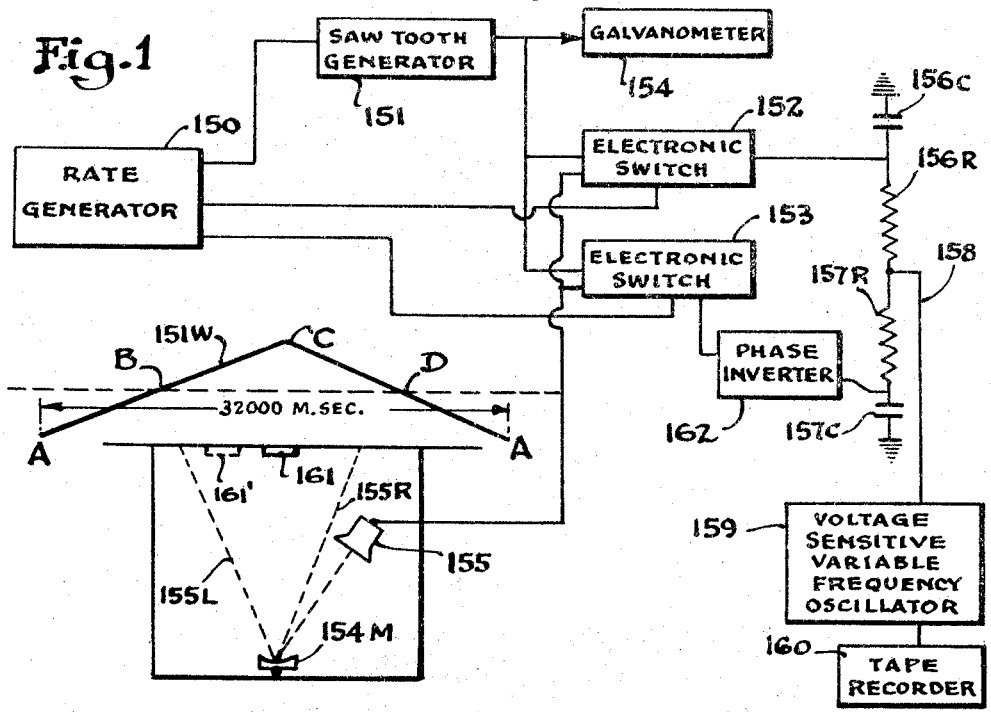

July 4, 1967     I. L. JOY     3,329,824

PHOTOELECTRIC PRINT READING CIRCUIT

Original Filed Sept. 24, 1959

Inventor
Ivan L. Joy
By Mann, Brown & McWilliams
Attorneys

United States Patent Office 3,329,824
Patented July 4, 1967

3,329,824
PHOTOELECTRIC PRINT READING CIRCUIT
Ivan L. Joy, 1616 W. Dudley Road,
Topeka, Kans. 66600
Original application Sept. 24, 1959, Ser. No. 841,972, now Patent No. 3,209,220, dated Sept. 28, 1965. Divided and this application Dec. 21, 1964, Ser. No. 428,003
3 Claims. (Cl. 250—214)

This application is a division of application Ser. No. 841,972, filed Sept. 24, 1959, now U.S. Patent 3,209,220 issued Sept. 28, 1965.

This invention is concerned with control systems in which control intelligence is represented in terms of variable frequency control signals and in which the controlled equipment is selective in its response to the control signals in accordance with the frequency value thereof.

The invention finds application to situations wherein it is desired to remotely and/or automatically control a certain physical property, condition, or characteristic of controlled equipment in accordance with a predetermined programming sequence.

More particularly, the invention finds important application in the burgeoning automation field and offers a new approach in controlling the position of a controlled member.

In accordance with the present invention, the positional control intelligence is programmed in the form of a variable frequency signal, the instantaneous frequency value of which represents the instantaneous positional relationship of the controlled member.

A control system employing frequency for representing intelligence and for controlling equipment offers many advantages, including the following:

(1) Frequency stability is, in general, readily maintained with a high degree of perfection;

(2) Frequency reading with extreme accuracy is possible with simple, low-cost equipment;

(3) Frequency representation of intelligence is compatible with analog and digital techniques and conversion between systems is readily accomplished;

(4) Temperature compensation is readily accommodated;

(5) Frequency-sensitive systems are flexible in application and adaptation to various methods of control, intelligence feedback, dynamic compensation, and anti-hunt techniques;

(6) Variable frequency signals are ideally suited for recording and reproduction with tape-recording equipment;

(7) Frequency-responsive position-sensing equipment for use in providing initial control intelligence or intelligence feedback may employ tuning techniques involving little or no friction, an important factor in sensing position of delicate equipment such as gyroscopes;

(8) Physical complexity, size and cost of frequency-responsive systems are greatly reduced; and (9) Linearly responsive frequency-sensitive systems can be provided to facilitate remote programming of control intelligence and/or to eliminate need for intelligence feedback.

Other objects and advantages of the invention will be apparent during the course of the following description.

Figure 2:
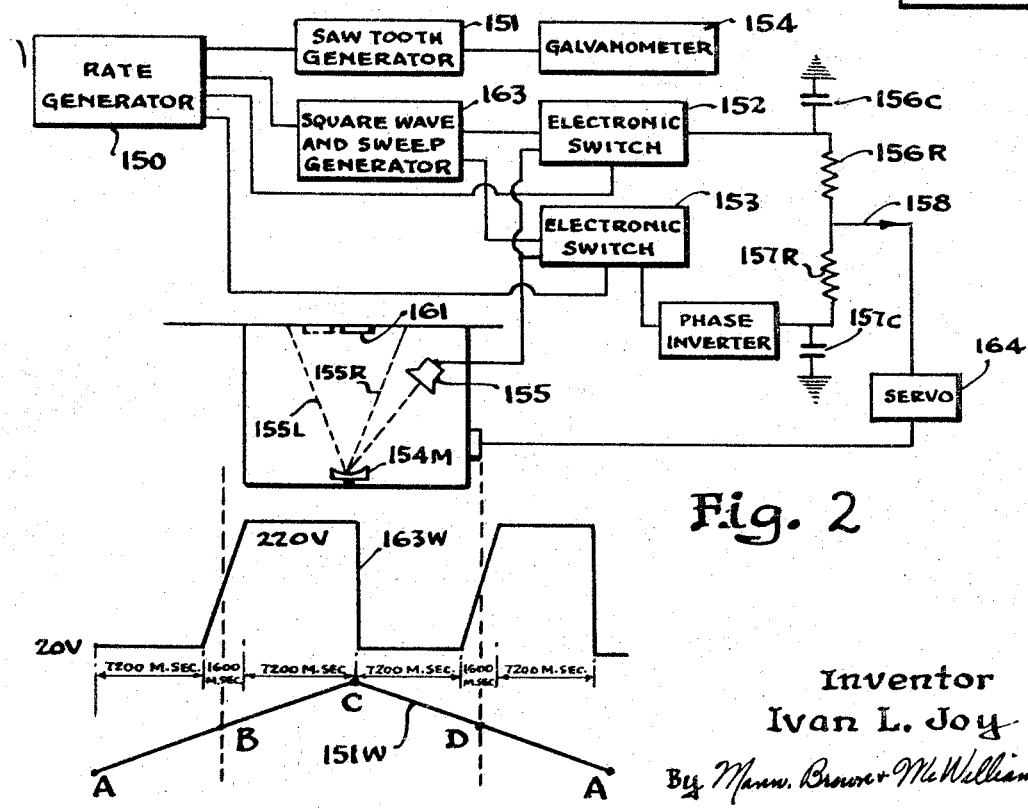

In the drawings:

FIGURE 1 is a diagrammatic illustration of a profiling arrangement for reading a blueprint and representing the intelligence thereof into a variable frequency signal; and FIGURE 2 illustrates a profiling arrangement generally similar to that of FIGURE 1 and including a number of circuit refinements for improving the accuracy thereof.

There are numerous applications wherein the frequency-programming sequence for the command signal is to be determined in accordance with the drawing outline on a blueprint, and in FIGURE 1 a simplified blueprint-profiling arrangement for preparing a variable frequency command signal representative of the blueprint profile is illustrated. The profiling arrangement is shown as including a rate generator 150 connected to trigger a saw-tooth generator 151 and connected to control the turn-on time of electronic switches 152 and 153. The output from the saw-tooth generator is shown at 151W and, as illustrated, a full timing cycle is assumed to be 32,000 microseconds. The output wave 151W of the saw-tooth generator is applied to a galvanometer 154 having the usual oscillating mirror 154M and this mirror, which is operatively associated with a photocell pickup unit 155 is caused to oscillate back and forth so that the line of sight of the photocell unit 155 may be varied between the right and left limit positions indicated by the dotted lines 155R and 155L, respectively. It will be assumed that when the waveform 151W is at the point A, the line of sight of the photocell 155 is along the line 155L; when the waveform is at the point B, the line of sight is approximately midway between 155L and 155R; at the point C, the line of sight is along the line 155R; and at D, it is the same as B.

The output from the saw-tooth generator in this simplified version of FIG. 1 is also shown as being applied through the electronic switches 152 and 153 to feed a comparison network that comprises capacitor 156C and resistor 156R, capacitor 157C, and resistor 157R. The midpoint of the comparison network has a connection line 158 that may feed a voltage-sensitive variable frequency oscillator 159 which is in turn connected to a tape recorder 160, if the profiling intelligence is to be stored for later use. Alternatively the oscillator 159 could be connected to constitute the command section of the control system of this invention. The photocell unit 155 is electrically connected to turn off each electronic switch at the time that the photocell unit sees a line on the blueprint.

The operation of the profiling apparatus may now be described as follows: The rate generator 150 initiates the saw-tooth generator 151 to develop the waveform 151W which is assumed to begin at point A, as indicated. Simultaneously with the initiation of the saw-tooth generator, the electronic switch 152 is turned on by the rate generator and as the saw-tooth voltage proceeds towards the point B, the galvanometer movement 154 swings the line of sight of the photocell unit 155 clockwise, or from left to right, as viewed in FIG. 1.

The blueprint line is shown at 161, and as the line of sight of the photocell unit 155 reaches the left-hand edge of the line 161, the photocell is energized to turn off the electronic switch 152. Assuming the voltage at point A to be +20 volts and at point B to be +120 volts, the condenser 156C will have been charged to a value of approximately 120 volts by the voltage applied through the switch 152 up to the time that the switch is cut off by the photocell.

It will be apparent that the voltage value that exists by virtue of the photocell's picking up the leaving or left-hand edge of the blueprint line could itself be employed as a representation of the position of the line.

However, the additional equipment of the present arrangement permits it to read the center of the line 161 and this is the preferred form of the invention.

The timing of the rate generator 150 is such that when the saw-tooth waveform is at the point C, the rate generator will turn on electronic switch 153 and the negative voltage excursion from C through D to point A of the saw-tooth wave is applied through electronic switch 153 and inverted in phase in the phase inverter 162 to charge capacitor 157C to a positive value that tends to oppose the positive charge on capacitor 156C. As the voltage excursion proceeds from point C to point D, the line of sight of the photocell unit 155 swings from 155R in a counterclockwise direction and approaches the right edge of the blueprint line 161. As soon as the photocell sees the line 161, electronic switch 153 is turned off by the photocell and this determines the magnitude of the charge that is built up on capacitor 157C.

Assuming that the blueprint line 161 is precisely centered with respect to the sweep of the line of sight of the photocell unit 155, a zero voltage appears on connection line 158 at the output of the comparison network. But assuming the blueprint line were at the position indicated at 161' the voltage built up on capacitor 157C would predominate and a voltage of negative polarity would appear on line 158, the magnitude of the voltage being correlated with the displacement of the line 161' from the center point of the sweep of the line of sight. Similarly if the blueprint line were displaced to the right of center, a positive voltage would appear at the connection line 158. It will be understood that the voltage value and polarity that is applied over line 158 to the voltage sensitive variable frequency oscillator 159 will determine the frequency output.

It should be noted that the technique might also be applied for causing the photocell unit 155 to shift so that the center point of its sweep of line of sight will always be directly over the line. In this instance, a suitable servo mechanism might be connected to the output voltage of line 158 to mechanically control the relative position of the photocell unit. In this instance the changes in position of the photocell unit would be mechanically transmitted to a position oscillator for developing a variable frequency command signal for use in the control system of this invention.

FIG. 2 illustrates a refined profiling arrangement, the major components of which correspond identically with that of FIG. 1. In FIG. 2, however, the rate generator 150 separately initiates the saw-tooth generator 151 and a square wave and sweep generator 163. The output of the generator 163 is shown at 163W and it is characterized by its steep slope at the points corresponding to the B and D points of the saw-tooth wave 151W. The wave 163W is connected to feed through the electronic switches 152 and 153 and therefore it determines the voltage charges that are built up on the condensers 156C and 157C. In the arrangement of FIG. 2 the output from the resistor-capacitor comparison circuit is shown connected to a servo mechanism 164, which in turn, is mechanically linked to the housing of the galvanometer mirror and photocell pickup unit for shifting the photocell until the center point of the sweep of the photocell's line of sight is coincident with the blueprint line 161. The steep slope of the charging voltage waveform 163W provides increased accuracy for the profiling apparatus. Representative values for the timing and voltage of waveform 163W are shown on FIG. 2.

The foregoing description and the drawings are given merely to explain and illustrate my invention, and the manner in which it may be performed, and the invention is not to be limited thereto, except insofar as the appended claims are so limited since those skilled in the art who have my disclosure before them will be able to make modifications and variations therein without departing from the scope and spirit of the invention.

Typical circuit components for use in the automation system of this invention are listed below:

| | |
|---|---|
| Electronic switches 152 and 153 (FIGS. 1 and 2) | "Industrial Electronics Control Circuits," by Markus and Zeluff, p. 31. |
| Servo 164 (FIG. 2) | "Electronics for Communications Engineers," by Markus and Zeluff, p. 513, FIG. 2. |

I claim:
1. A print reading circuit comprising an electronic switch, a signal measuring network connected across said switch, a photocell connected to said switch for disabling said switch when its line of sight intersects a line on the print, motive means for the photocell for sweeping its line of sight across the print, waveform generating means connected through said electronic switch to charge said network and connected to said motive means to actuate said motive means, and a rate generator actuating said generating means and connected to turn on said electronic switch during one direction of movement of said line of sight.

2. A print reading circuit comprising a pair of electronic switches, a signal storage and divider network connected across said switches, a galvanometer having a mirror oscillated by said galvanometer, a photocell facing said mirror for directing its line of sight back and forth across said print as said mirror oscillates, said photocell being connected to each of said switches for disabling said switches when the line of sight of the photocell intersects a line on the print, waveform generating means connected through said electronic switches to charge said network and connected to said galvanometer to drive said mirror, and a rate generator actuating said generating means and separately connected to said electronic switches to turn on one switch during the movement of said mirror in one direction and to turn on the other switch during movement of said mirror in the opposite direction.

3. A print reading circuit comprising a pair of electronic switches, a signal storage and divider network connected across said switches, a galvanometer having a mirror oscillated by said galvanometer, a photocell facing said mirror for directing its line of sight back and forth across said print as said mirror oscillates, said photocell being connected to each of said switches for disabling said switches when the line of sight of the photocell intersects a line on the print, waveform generating means connected through said electronic switches to charge said network and connected to said galvanometer to drive said mirror, and a rate generator actuating said generating means and separately connected to said electronic switches to turn on one switch during the movement of said mirror in one direction and to turn on the other switch during movement of said mirror in the opposite direction, driving means connected to the output of said divider network and directionally responsive to opposite polarity changes from a median value of said output to vary the positional relationship of said photocell and print for continuously reestablishing said median value.

References Cited

UNITED STATES PATENTS

| | | | |
|---|---|---|---|
| 2,658,146 | 11/1953 | Jackson | 318—20 |
| 2,892,948 | 6/1959 | Frantz | 250—202 |
| 3,009,064 | 11/1961 | Cook et al. | 250—219 |
| 3,015,730 | 1/1962 | Johnson | 250—202 |
| 3,017,552 | 1/1962 | Brouwer | 318—39 |
| 3,034,028 | 5/1962 | Jamieson | 318—20 |
| 3,209,220 | 9/1965 | Joy | 318—18 |

RALPH G. NILSON, *Primary Examiner.*

M. A. LEAVITT, *Assistant Examiner.*